United States Patent
Miller

[15] 3,637,424
[45] Jan. 25, 1972

[54] TREATED CARBON CLOTH FOR THE PREPARATION OF COMPOSITE STRUCTURES AND METHOD OF TREATMENT

[72] Inventor: Leroy J. Miller, Canoga Park, Calif.

[73] Assignee: The United States of America as represented by the Secretary of the Air Force

[22] Filed: June 11, 1969

[21] Appl. No.: 832,495

[52] U.S. Cl..............................117/118, 8/115.5, 8/115.6, 117/47 R, 117/76 T, 117/121, 117/228
[51] Int. Cl................................................B44d 5/12
[58] Field of Search.....................117/118, 47, 76, 121, 228; 8/115.5, 115.6

[56] References Cited

UNITED STATES PATENTS 1,178,546  4/1916  Snyder...............................117/47 R

*Primary Examiner*—Alfred L. Leavitt
*Assistant Examiner*—Janyce A. Bell
*Attorney*—Harry A. Herbert, Jr. and Alvin B. Peterson

[57] ABSTRACT

A method for treating carbon cloth with an aromatic disulfonic acid and the treated cloth produced thereby. The method comprises the steps of (1) wetting the carbon cloth (or fibers) with a molten disulfonic acid or a solution of the disulfonic acid; (2) drying the cloth by evaporation of the solvent, if a solvent is used, leaving the disulfonic acid behind to coat the fibers; (3) heating the disulfonic acid coated cloth to a temperature at which the acid can react with the surface of the cloth and/or with itself; (4) washing the coated cloth with solvent to remove any excess, unreacted disulfonic acid; and (5) drying the cloth by evaporating away the washing solvent. The cloth prepared by the above method is useful as a reinforcing material in composite structure.

4 Claims, No Drawings

TREATED CARBON CLOTH FOR THE PREPARATION OF COMPOSITE STRUCTURES AND METHOD OF TREATMENT

BACKGROUND OF THE INVENTION

1. Field of the Invention

This invention is in the field of reinforcing materials for composite structures.

2. Description of the Prior Art

In the preparation of reinforced resin composites, it is necessary that the resin form a bond to the reinforcing material. Occasionally, when carbon cloth is used as the reinforcing material, a problem is encountered in that the resin does not wet or penetrate the cloth. When this happens, the bond between the resin matrix and the reinforcing cloth is very weak. In such a case, the plies of reinforcing cloth readily separate and, because of the separation, the mechanical strength of the composite structure is unsatisfactorily small.

In the prior art, the problem of bonding between a resin and a carbon cloth (or a fiber reinforcement) has usually been handled by changing the composition of the resin. Wetting ability has been used as a criterion for judging the suitability of a resin composition for making composite structures. However, the use of resins with poor wetting properties is sometimes desired, in the field of composite structures, because of the thermal stability that such cured resins offer. Thus the need for some reliable method of treating the reinforcing material to make usable with a resin having poor wetting ability has arisen.

Partial oxidation of the surface of carbon cloth has been one method tried in the attempt to improve bonding characteristics of reinforcing material. This has not yet become an established technique.

SUMMARY OF THE INVENTION

The practice of this invention allows one to use resins which have poor wetting ability as matrix materials in the fabrication of composite structures. In particular, this invention allows one to mold composite structures from aromatic polymers which have poor flow and wetting characteristics because it provides a method for improving the bond between the polymer and a carbon reinforcement. This invention is especially useful in preparing composite structures from polyphenylene resins and carbon or graphite cloth or fibers. It is most especially useful if the polyphenylene prepolymer softens only at high temperatures and undergoes little flow prior to curing.

This invention solves the problem of resins with poor wetting characteristics by providing carbon or graphite cloth or fibers which will permit a resin or resin lacquer with poor wetting qualities to form a strong adhesive bond with the cloth or fibers during the cure of the resin.

This invention may be summarized by the following steps. Carbon cloth (or fibers) is treated by (1) wetting with either molten disulfonic acid or a solution of disulfonic acid; (2) drying the cloth by evaporation of the solvent, if a solvent is used, leaving the disulfonic acid behind to coat the cloth or fibers; (3) heating the coated cloth or fibers to a temperature at which the acid can react with the surface of the cloth or fibers and/or with itself; (4) washing with a solvent to remove any unreacted, excess disulfonic acid; and (5) drying the cloth by evaporating off the washing solvent. After undergoing this treatment the cloth or fibers may be used with resins (particularly polyphenylene resins), which have poor wetting characteristics, to fabricate composite structures. The fabrication of the composite may be carried out under conditions of elevated temperature and pressure which are usual for the particular resin being used.

DESCRIPTION OF THE PREFERRED EMBODIMENTS

A general summary of the steps of the process of this invention has been given above. Specific examples will be given later. Examples of disulfonic acids which may be used are 4,4'-biphenyldisulfonic acid, m-benzenedisulfonic acid, 1,5-naphthalenedisulfonic acid, 2,4-toluenedisulfonic acid, 3,5-chlorobenzenedisulfonic acid, bis(4-sulfophenyl)ether, 4,4'-diphenylmethanedisulfonic acid, and the like. The term disulfonic acid as used herein also includes trisulfonic acids and tetrasulfonic acids such as 1,3,5-benzenetrisulfonic acid, 1,3,5-benzenetrisulfonic acid, 1,3,5-naphthalenetrisulfonic acid, 1,3,5,7-naphthalenetetrasulfonic acid, and 3,5,8,10-pyrenetetrasulfonic acid since these are disulfonic acids which have additional sulfonic acid groups as substituents.

Solvents used in the application (step 1) and washing (step 4) generally described above may be selected from a wide range of volatile, inert solvents in which the disulfonic acid used is soluble. Since water is inert, volatile, inexpensive, and a good solvent for disulfonic acids, water is a preferred solvent.

Drying operations (steps 2 and 5 above) may be carried out at almost any temperature from ambient to 350° C. in the presence of a strong desiccant if the solvent is water or in the presence of a suitable absorbent if some other solvent is used. If the temperature is sufficiently high the solvent can be evaporated without a desiccant or absorbant. For example, if the solvent is water, it can be removed at temperatures above 100° C. at atmospheric pressure or at temperatures below 100° C. at reduced pressures. Preferably, however, water is removed at temperatures between 150° and 250° C. because water is strongly held by disulfonic acids. Temperatures above 350° C. should be avoided because extensive decomposition of the disulfonic acid may occur at higher temperatures and an undesirable coating may be formed on the cloth.

The step in which the cloth (or fibers) is heated with the disulfonic acid (step 3) should be carried out at 250°–350° C., and preferably at 275°–325° C. This is the step in which the acid reacts with the surface of the carbon cloth (or fibers). The carbon cloth, being graphitic in character, undoubtedly has hydrogen atoms attached. The reaction between the disulfonic acid and carbon surface may be characterized by the following reaction in which 4,4'-biphenyldisulfonic acid is shown as an example of a disulfonic acid.

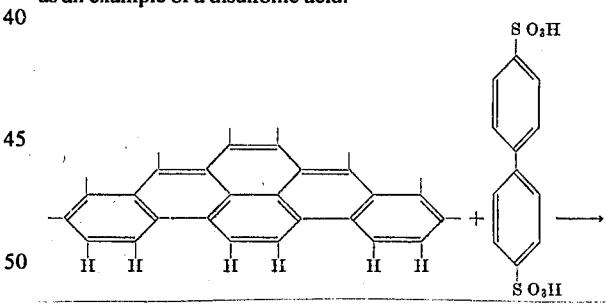

Such a reaction attaches the sulfonic acid nucleus chemically to the carbon cloth. A sulfonic acid group remains to react with the aromatic rings of an aromatic resin and thus serves to bind the resin chemically to the cloth when a composite is fabricated. The bond to an aromatic resin is formed under normal curing conditions at temperatures over 250° C.

Disulfonic acids are also known to polymerize at temperatures over 250° C. and this probably also happens on the surface of the cloth. A polymer so formed does not hinder and may actually help in binding a resin to the cloth.

Temperatures below 250° C. (for step 3) may result in requiring an inordinately long time for reactions to occur. Temperatures over 350° C. can be tolerated for short periods of time. However, too long an exposure to greater than 350° C. temperatures may result in complete polymerization of the disulfonic acid to an insoluble, infusible polymer. A coating of such a polymer on the cloth is not entirely detrimental to bond formation by the resin when a composite is later fabricated but ordinarily such a coating is to be avoided.

In general it is preferred to keep the weight of acid at about 15–25 percent of the weight of the cloth. However, both higher and lower weight percentages have been used. As the weight of the acid is decreased, the effect of the acid is decreased. Too little acid may have little or no useful effect. If a high weight percentage of acid is used, for example, if the acid used is equal in weight to the weight of the cloth, the high weight percentage of acid will not prevent wetting of the cloth and bonding to the cloth. However, it may be undesirable to add more weight to the cloth than is necessary.

Excess disulfonic acid can be washed from the cloth. However, unreacted disulfonic acid need not be removed since it can react with both the cloth and the resin during the curing step of composite fabrication. Furthermore, it is not absolutely necessary to heat the disulfonic acid with the cloth prior to combining the cloth with a resin to fabricate a composite since the coating of the acid can react with both the carbon fibers and the resin during curing.

The following specific examples show how the invention may be practiced.

EXAMPLE I

A solution of 10 grams of commercial 4,4'-biphenyldisulfonic acid in 30 ml. of water was sprayed onto a piece of carbon cloth, 5 inches by 10½ inches, sold by Hitco and known in the trade as CCA-1 carbon cloth. The coated cloth was dried in an oven at 120° C. for 3½ hours and then cut to a size suitable for further treatment. The cloth was stiff and easy to cut without fraying at the edges.

Ten pieces of cloth so prepared were placed in molten 4,4'-biphenyldisulfonic acid and kept at a temperature of 250°–280° C. for 30 minutes. They were then removed, washed with water, and dried for 2 hours at 150°–160° C. The pieces were slightly stiffer than the original cloth and had resisted fraying during the treatment.

A composite pellet was fabricated from the treated cloth (3.72 grams) and a molding powder prepared by heating equal parts by weight of polyphenylene and 4,4'-biphenyldisulfonic acid for 15 minutes at 140°–150° C. and then for 30 minutes at 180°–228° C. The material (cloth and molding powder) was loaded into a hot mold and cured for 2 hours at 3,000 p.s.i. and 530° F. The cured pellet weight 4.82 grams. The resin had penetrated and wetted the cloth and bonded to the cloth to yield a uniform composite. In a composite structure molded in a similar manner but without prior treatment of the cloth, the resin failed to wet the cloth and the pellet disintegrated along the planes of the cloth.

EXAMPLE II

Dry carbon cloth (19.3 grams) was sprayed with an aqueous solution of 4,4'-biphenyldisulfonic acid until the cloth was thoroughly wet. The weight of the acid plus solvent on the cloth was about 9.3 grams. The coated cloth was dried for one hour at 250° C. and weighed 25.47 grams. It was then heated for one hour at 325° C. After the second heating, the cloth weighed 23.33 grams, 17.3 percent of which was the weight of acid added by the treatment.

This treated cloth was used to fabricate a composite using a molding powder prepared from a 3:2 mixture by weight of polyphenylene and 4,4'-biphenyldisulfonic acid. The resin bonded well to the cloth and a strong composite was formed.

I claim:
1. A method for treating carbon cloth, said method comprising the steps of:
    1. wetting said carbon cloth with a water solution of a disulfonic acid selected from the group consisting of 4,4'-biphenyldisulfonic acid, m-benzenedisulfonic acid, 1,5-naphthalenedisulfonic acid, 2,4-toluenedisulfonic acid, 3,5-chlorobenzenedisulfonic acid, bis(4-sulfophenyl) ether, 4,4'-diphenylmethanedisulfonic acid, 1,3,5-benzenetrisulfonic acid, 1,3,5-naphthalenetrisulfonic acid, 1,3,5,7-naphthalenetetrasulfonic acid, and 3,5,8,10-pyrenetetrasulfonic acid;
    2. heating at a temperature of less than about 350° C. to effect evaporation of the water and leave the cloth coated with disulfonic acid;
    3. heating the disulfonic acid coated cloth at a temperature of less than about 350° C. to effect a reaction between the disulfonic acid and the cloth;
    4. washing the cloth with water to remove any excess disulfonic acid; and
    5. drying the cloth.
2. The method of claim 1 wherein the disulfonic acid is 4,4'-biphenyldisulfonic acid.
3. The method of claim 1 wherein the disulfonic acid used for wetting is added in an amount in the range of from about 15 to about 25 weight percent of the cloth.
4. A treated carbon cloth produced by the method of claim 1.

* * * * *